3,170,778
DESALTING SEA WATER
Ernest R. Roth, Media, Pa., assignor to Roy F. Weston, Inc., Newtown Square, Pa., a corporation of Pennsylvania
Filed Mar. 23, 1961, Ser. No. 97,827
4 Claims. (Cl. 62—58)

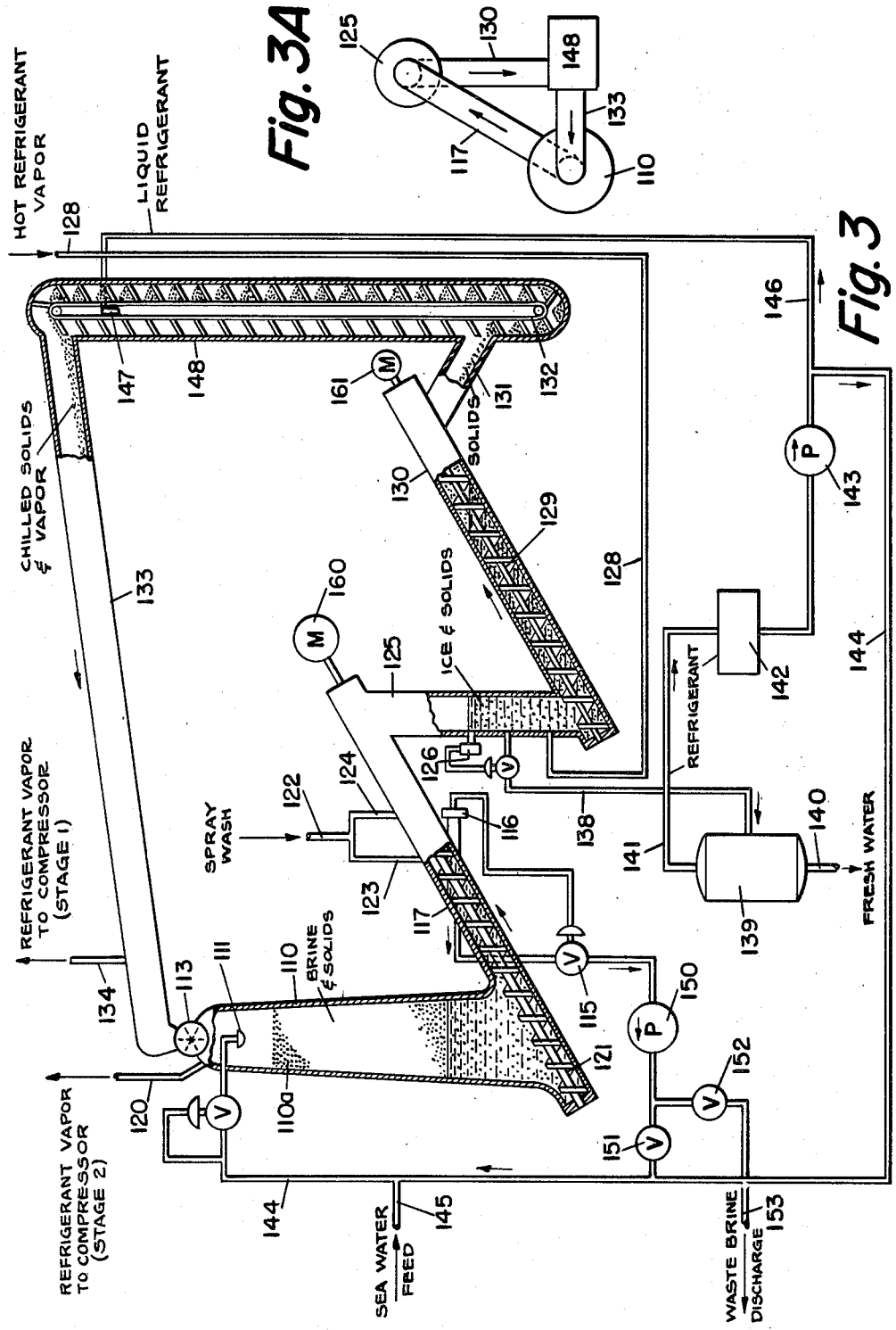

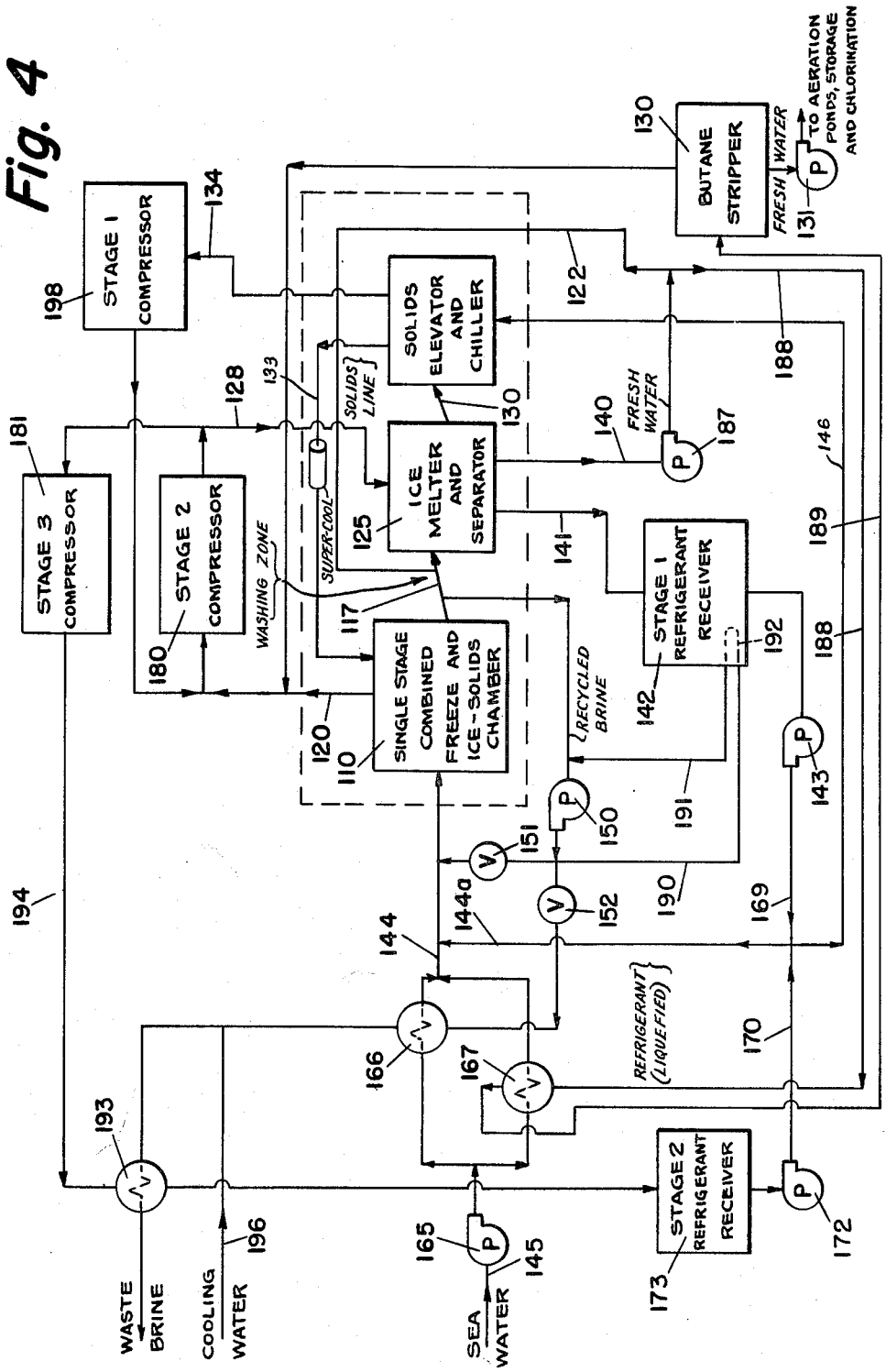

This invention relates to methods and apparatus for the separation of solvent and dissolved solids, as for example removal of water from an aqueous solution such as sea water, and has for an object provision of a system which provides economical recovery of end products comprising essentially a solvent free of contaminants, concentrates with reduced solvent, or separation and recovery of a purified dissolved solid.

Though the present invention is particularly directed to the desalting of sea water, it is to be understood that it may be applied to other kinds of feed streams where the purpose is to remove solvent or crystallized solids therefrom.

For many years the need of providing methods and apparatus for desalting sea water has been recognized, and there have been many proposals including freezing processes for accomplishing the stated objective. One of the principal difficulties with desalting systems has been their cost of operation in terms of desalted water and which includes maintenance problems in respect to the apparatus involved. In respect to the freezing process, it has been found that brine adheres to the finely divided crystals of ice as they are formed as the result of lowering the temperature of the feed stream and that the elimination of the adherent brine from the ice crystals has required excessive washing with resultant decreased yield and thus high cost per unit of output of desalted water.

In accordance with the present invention, it has been found that there may be substantially eliminated the formation of minute ice crystals whose surface area is extremely great in proportion to their volume, and thus there may be vastly reduced the surface area per unit weight of ice formed in the cooling process. In accordance with the invention there is mixed with the feed stream discrete particles of materials inert to all of the ingredients of the feed stream, sea water, but which have compositions providing surfaces to which ice readily forms during the freezing process. By providing the discrete seeding particles, ice preferentially forms about them, and inasmuch as they are provided in discrete sizes, as for example about a millimeter in minimum dimension, ice forms in substantial quantity in terms of surface area relative to weight as compared with ice crystals which would otherwise form in the absence of the seeding materials of discrete size.

In a preferred form of the invention, there is added directly to the mixture of sea water and seeding particles a refrigerant inert to the ingredients of the sea water and the solids, and under such conditions that the combined stream as it is fed to a freezing zone has therein a substantial part of its volume made up of bubbles of refrigerant which serve the function of providing increased separation rates between the seeding materials with adhering ice and residual brine. As the mixture is then fed into the freezing zone, the refrigerant in gaseous and bubble form rises at a fast rate in the mixture, and thus when the seeding materials have a density which makes them buoyant in the liquid mixture, the rising bubbles of refrigerant, besides acting to cool the mixture, impart added buoyancy to the seeding particles, thus aiding in floating the seeding particles with ice adherent thereto to the surface. This increases the speed of operation, and thus increases the efficiency of operation.

For further objects and advantages of the invention and in particular for further details as to the apparatus, heat exchange provisions, and other features of novelty, reference is to be had to the following description taken in conjunction with the accompanying drawings, in which:

FIG. 1 diagrammatically illustrates a preferred embodiment of the invention;

FIG. 2 is a flow diagram of the system and process as a whole;

FIG. 3 diagrammatically illustrates a modification of the invention;

FIG. 3A is a plan view of a preferred disposition of the apparatus of FIG. 3;

FIG. 4 is a flow diagram of the system and process of FIG. 3.

Figure 1:
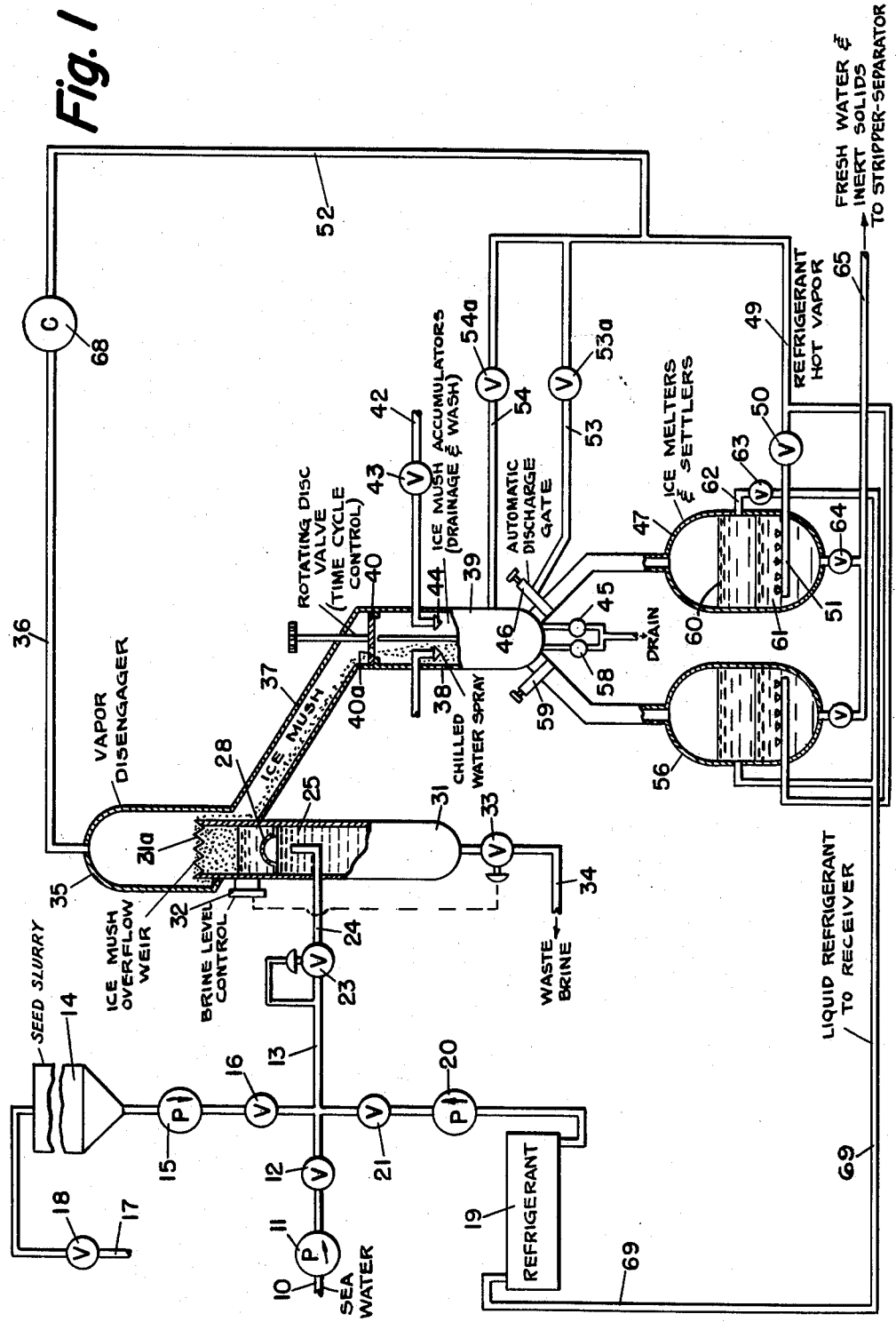

In carrying out the invention in one form thereof, the feed stream, which is shown as sea water, enters the apparatus by a supply line 10, is elevated in pressure by a pump 11 and delivered by way of a valve 12 to a mixing line 13. The discrete seeding particles flow by gravity from a bin 14 under the control of a pump 15 and by way of a valve 16 to the mixing line 13. The seeding particles may be pumped inasmuch as water is added to the storage bin 14 by way of a supply line 17 and a valve 18. Obviously, the water supplied to the bin 14 may be a branch line from the supply line 10 and may form a part of the feed stream of sea water.

To maintain a slurry within tank 14, stirring means may be provided, though not shown. From the valve 16 the slurry including the seeding particles enters the mixing line 13. There is also supplied to the mixing line 13 a refrigerant as from a source of supply or storage tank 19 by way of a pump 20 and a flow control valve 21. The mixture of feed stream, seeding particles, and refrigerant passes through a pressure-reducing valve 23 which maintains constant the back pressure in line 13 to assure that the refrigerant remains as a liquid until after passage through the reducing valve 23 into delivery line 24. The mixing line 24, besides being a conduit for flow of the mixture into a freezing zone 25, may be of larger diameter than pipe 13 in order to promote the formation of a multiplicity of bubbles of refrigerant which form as a result of the reduction of pressure on the liquid refrigerant as it passes through valve 23 which also is of such design to promote bubble formation. It is preferred that the multiplicity of bubbles or subdivided gaseous refrigerant form in line 24 in order to provide increased separation rate of particles of the seeding material, by imparting added buoyancy to the particles in the mixture after delivery into the cooling zone, and to hasten refrigeration by reason of the mixture of the refrigerant throughout the material to be cooled in the freezing zone and by reason of the flashing of the refrigerant for absorption of heat from the feed material and the seeding particles.

As a result of the foregoing, the mixture as it is delivered from the outlet of line 24 is rapidly cooled, and ice immediately begins to form on and about the seeding particles. Since the through-put is high and thus the velocities from delivery line 24 are likewise high, it is preferred that in the cooling zone there be provided a turbulence dissipator 28 which may be in the form of a perforate wall or screen having openings or mesh considerably larger than the seeding particles after addition thereto of a layer of ice. The ice thickness on the seeding particles will, of course, vary, but on average it is of finite thickness and may be of the order of 0.020 inch.

It is preferred that the seeding materials have minimum dimensions of about one millimeter, and maximum dimensions not greatly exceeding three millimeters. These seeding materials are conveniently available in the form of spheres, such for example as plastic spheres, and they may be made of glass, synthetic plastics, metals and wood, with the sole requirement that these beads, spheres and subdividing seeding materials shall be inert to the ingredients of the feed stream, sea water, inert to the refrigerant, and in particular do not provide any contaminant in the end product of desalted water. Additionaly, the seeding material shall have a surface to which ice readily forms. This latter property is present for finely divided glass, finely divided stone, particularly the silicates, aluminates, carbonates and the like, wood, the metals, and the synthetic plastics. Aside from plastics in the "Teflon" and "Kel-F" class, the synthetic plastics of both the thermosetting and thermoplastic type may be used. These materials all fall within the class of permanently solid materials at room temperature.

In the form of the invention illustrated in FIG. 1, it is preferred that the seeding material likewise have densities which in conjunction with the presence of the gas bubbles of the refrigerant are buoyant after formation of ice thereon. Thus, where heavier metals and glass may be utilized, it is preferred that they have hollow centers to provide the needed buoyancy. The seeding particles need not have smooth surfaces; in fact, a slightly roughened surface is preferred to promote formation of the ice with the surface.

The seeding materials will preferably be supplied to the mixing line 24 in quantity or amount roughly corresponding to about 2% to 10% by weight of the feed stream and which will normally fall within the range of between about 30% and 50% by volume of the aforesaid feed stream.

Thus as the ice forms about the seeding particles comprising at least 20% and as much as 50% by volume of the feed stream in the zone 25, there will be rapid rise of the particles and ice upwardly of that zone which, it will be noted, comprises a vessel 31 having an open upper end, the walls of which terminate in an overflow weir configuration such as the saw-tooth configuration 31a, providing a multiplicity of weirs for overflow of ice mush consisting of the seeding material and the adherent ice. The vessel 31 is also provided with a level control 32 which controls the level of brine through regulation of the operation of a discharge valve 33 for withdrawal of brine by way of line 34.

The upper end of vessel 31 is hermetically sealed into a vapor-receiving housing 35 having an outlet line 36 through which refrigerant may be withdrawn. Thus the vapor-receiving housing 35 provides a separating zone between the refrigerant and the ice mush. The ice mush, after discharge over the weir 31a, flows by gravity down an inclined discharge line 37 into a selected one of a plurality of washing zones, only two of which, the zones 38 and 39, have been illustrated. With the parts in the position shown, a discharge opening 40a in a control valve 40, of the rotating disc type and under cycle control is in register with the washing zone 38. Thus the ice mush flows through opening 40a into washing zone 38.

It will be assumed that during a previous cycle the washing zone 39 has been filled with ice mush. Wash water supplied through a supply line 42 under the control of a valve 43 is discharged from a distribution head 44 for washing from the particles of ice brine which may have adhered thereto. By reason of the fact that all particles of ice are of substantial size, only a minimum of washing is required. Thus, the wash water need be only from about 3% to 10% of the desalted product.

The wash water is discharged by way of a valve 45. At the conclusion of the washing cycle, the valve 45 is closed, and a gate valve 46 opened for discharge of the washed ice into an ice-melting and water-refrigerant separation zone or vessel 47. It will be understood that the vessel 47 will operate at a relatively low temperature, of the order of 34° F., and a temperature and pressure at which the refrigerant, for example butane, is liquid. Accordingly, the separation zone may be conveniently utilized for cooling and condensing the refrigerant which enters in hot vapor form. As illustrated, it is introduced by way of a line 49 and valve 50 into vessel 47 where it is discharged in the lower portion by a distributing head 51. The hot refrigerant vapors rise through the inlet to vessel 47 and upwardly through the washing zone 39. Inasmuch as ice tends to adhere to surfaces with which it comes in contact, and inasmuch as some of the wash water may freeze in the washing zone 39, the hot refrigerant vapor hastens the melting of the ice and assures the delivery of all of the end product into the vessel 47.

In accordance with the invention, a part of the hot vapors as from a line 52, as by way of a valve 53a and line 53 into the body and valve disc grooves of gate valve 46, where it serves the dual purpose of maintaining all moving parts free of ice and frost, and also aids in melting the ice that may remain in the washing zone 39. Alternatively, and also to supplement the previous streams of hot refrigerant vapors, a third stream may be supplied by way of a valve 54a and line 54 at one or more points along the washing zone 39. Though the refrigerant lines have been illustrated in association with but the single washing zone 39, it is to be understood that corresponding lines will be associated with each of the other zones and including the separating vessel and separating zone 56.

The timing cycle is such that as the ice in washing zone 39 is fuly melted and/or discharged into vessel 47, the washing zone 38 is filled with ice mush. At the end of a cycle, the disc valve 40 is rotated to transfer the flow of ice mush to an empty washing zone 39 which at that time will, of course, have its gate valve 46 closed and its valve 45 closed. The zone 38 then becomes a washing zone with valve 58 open. The foregoing cycle is again repeated with closure of valve 58 and opening of delivery valve 59.

As indicated above, the temperature and pressure in vessel 47 are such to keep the refrigerant in liquid form. Thus there forms in the separating zone 47 an upper level of liquid refrigerant 60 and a lower level of desalted water 61. Liquid refrigerant is withdrawn by way of a line 62 and valve 63, and desalted fresh water is withdrawn from the bottom of vessel 47 by way of a valve 64 and line 65.

Though not illustrated, the vessels 47 and 56 will be provided with fluid gages for indication of the fluid interfaces. Instead of withdrawing butane through line 62 in its illustrated position, that line may be located at the lower portion of the vessel and the operation will proceed as follows: The valve 64 will first be opened for withdrawal of the desalted fresh water. After the interface level has been brought to a point near the bottom of the vessel, the valve 64 will be closed and the valve 63 opened for withdrawal of the butane, together with a small amount of water and to assure the absence of refrigerant in the end product, fresh water.

Since the seeding particles have in the above description been assumed to be buoyant in character, it will be understood that they will be carried substantially exclusively in the level of liquid refrigerant 60 in vessels 47 and 56. Thus, the fresh water will be free of inert solids. The liquid refrigerant may be returned to storage in the vessel 19 by way of line 69.

In utilizing the system and methods of FIG. 1 to produce salt-free water, meaning water having a content of salt less than about 500 parts per million, additional features will preferably be utilized. More particularly in the flow diagram of FIG. 2 there have been illustrated the vessels, piping, pumps and circuits representative of a commercial installation. Sea water, preferably pretreated for the removal of sediment and the like, is brought to the system through a supply line 10, elevated in pressure by pump 11, and through a header 72 sent in divided flow through heat exchangers 73 and 74. These heat exchangers reduce the temperature of the sea water, and while under the pressure of the pump these streams are returned to a mixing line 13. The sea water there has mixed with it a slurry of solids as from line 15a, while liquid refrigerant is introduced into line 13 by way of line 20a. The back pressure is maintained in line 13 by the pressure regulator 23. The mixture at reduced pressure is introduced by way of line 24 into the freezing and flotation chamber 31. From the flotation chamber 31 the refrigerant is withdrawn as vapor by way of line 36 which forms the intake to a compressor 68. The refrigerant vapor at a considerably higher temperature and pressure due to the compression thereof then divides to flow by way of line 76 to an inlet of the second compressor 77, it being understood that suitable flow controllers will be utilized to assure that part of the refrigerant from compressor 68 flows by way of line 76 and another part by way of line 52 to form the source of supply of the higher temperature refrigerant vapor utilized for the melting of the ice in the washing zone 38, as well as for the melting of the ice in an ice accumulating vessel 47. The refrigerant from compressor 77 is delivered by line 79 to a heat exchanger 80 where it is reduced in temperature and condensed and delivered to a liquid refrigerant storage vessel 82 from whence it is delivered by pump 83 to the line 20a. Similarly, a pump 20 receives refrigerant from the vessel 19 in flow communication with the line 62 utilized as a part of the decanting operation in connection with the vessel 47. The pump 20 delivers refrigerant to the line 20a.

Wash water and brine derived from vessel 38, as well as brine from the freezing and flotation chamber 31, flow by way of line 85 to a pump 86. A slip stream is taken from the outlet of pump 86 for flow through lines 87 and 88 through a cooling coil 89 disposed within vessel 19 to maintain the refrigerant below its vaporizing temperature to assure a liquid feed to the pump 20. The principal stream from pump 86 flows by way of line 90 to form the cooling liquid for the heat exchangers 73 and 80 and is taken to waste by way of discharge line 91.

Fresh water derived from the melting and separating vessel 47 is elevated in pressure by pump 92 and divided into two streams. A smaller fraction is returned by way of line 42 to form the source of wash water for the ice after delivery from the freezing chamber 31, while the major portion flows by way of line 93 to form the cooling medium for the heat exchanger 74. The desalted or fresh water stream, after passage through the exchanger 74, is returned by way of line 95 to a stripping and solids-separating vessel 96.

Though the vessels 47 and 56 of FIG. 1 have been described as of the decanting type, it is not essential to the present invention that the separation between seeding particles refrigerant, and the fresh water be made in these vessels. A part of the seeding particles may well flow with the water through the lines 93 and 95 and into the vessel 96. In this vessel, however, there are utilized conventional techniques for removing therefrom all refrigerant and also removing therefrom the seeding particles, whereby only water is withdrawn by way of a line 98 for delivery by a pump 99 to storage and as the final end product of the system. The details of the vessel 96 need not here be set forth since such separating arrangements are well known to those skilled in the art and are available from the Dorr-Oliver Company. The refrigerant recovered from vessel 96 is returned by way of a line 101 and a pressure-regulating device 102 to the inlet line 36 to compressor 68, while a slurry of the seeding particles is removed by a pump 103 and delivered by line 104 to the storage vessel 14 as a part of the source of these particles for the mixing line 13. As indicated above, a substantial fraction of the seeding particles will be removed from the vessel 47 with the refrigerant, and this will form the remainder of the supply of the seeding particles to the mixing line 13. As indicated in FIG. 1, the vessel 14 will have an adequate storage capacity for any makeup of seeding particles which may be required, though none or little would be anticipated during operation.

By reason of the methods and apparatus of FIGS. 1 and 2, desalted sea water as an end product may be produced at relatively low cost and considerably below the cost of competing processes of other kinds. The conservation of the heat realized by the system of FIG. 2 contributes to the economy of operation, but basically the concept of utilizing the seeding particles to obtain areas of predetermined size on which the ice will form appears to be the principal contributor to economical operation in that the recovery for a given expenditure of energy is materially and significantly higher, since a minimum of washing is necessary with its consequent loss of an end product. In addition, the discrete particles materially and significantly contribute to the speed with which the ice may be removed from the brine in the freezing and flotation chamber 31, again to increase the output per unit time of operation. These factors together result in a system providing economical operation to a point where treatment of sea water to remove the salt and dissolve solids therein becomes practical.

Though the present invention has been described particularly in connection with the recovery of fresh water from sea water, it is to be understood that it is applicable to feed streams of all kinds in which solvent or dissolved solids may be removed as crystalled materials by the freezing process with direct or indirect refrigeration for the reduction of dissolvable solids and the like in the solvent, for the concentration of the remaining product as in the case of producing concentrates from citrus juices and the like, or for the production of purified compounds removed from a liquid component of the feed stream as crystalled solids produced by freezing and forming frozen layers on the discretep articles and recovered by melting.

Figure 2:
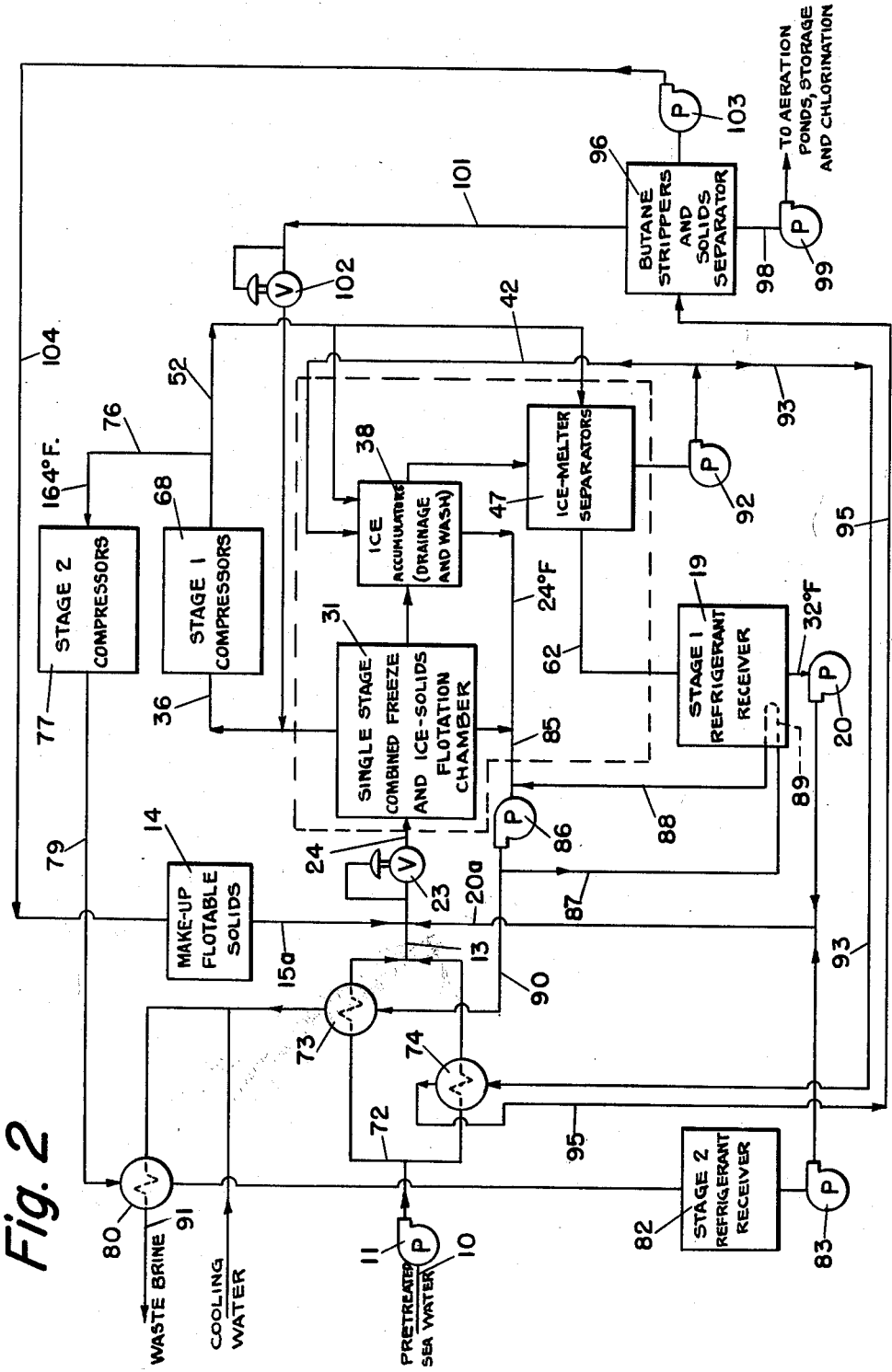

Though the embodiment as exemplified in FIGS. 1 and 2 operates with discrete particles which with their layers of ice are buoyant in the freezing zone, indication has already been made that the present invention is likewise applicable to discrete particles which are heavier than the liquid present in the freezing zone. FIGS. 3 and 4 are exemplary of the latter system in which a freezing vessel 110 is provided with a normally, relatively high level of discrete particles as indicated at 110a. These discrete particles likewise are well above the micron range and have sizes such that their minimum dimension will be at least 1 millimeter, and preferably not greater than about 3 millimeters. They may be in the form of beads, spheres, and the like. They may be metal, and since they are not to be buoyant in the mixture will not have hollow cores. Many of the denser rock-like materials may be utilized, as well as the heavier plastics. These discrete particles may likewise include wood having densities greater than the liquid mixture.

Within the vessel 110 there is delivered through a distributing nozzle 111 a feed stream of sea water supercooled, that is to say, at a temperature below its freezing temperature, and also chilled discrete materials introduced as by a star-feeder valve 113. The pressure within vessel 110 is low enough to assure vaporization of refrigerant contained within the feed stream. Water freezes as ice on the discrete materials on contact of the super-cooled feed stream and chilled discrete materials within vessel 110. To assure lack of adhesion of ice and frost and the like as between the discrete particles and the walls of the vessel 110, it will be observed that these walls are flared outwardly from top to bottom, providing a gradually increasing cross-sectional area and which assures the settling and/or flow of the finely divided particles and their layers of ice downwardly of vessel 110. At the lower portion of the vessel there will be present a body of brine which, by means of a valve 115 operated by a liquid-level controller 116, is maintained at a fairly constant height. The lower end of vessel 110 has an upwardly inclined portion 117 to form with vessel 110 a liquid trap. This assures that the refrigerant will be retained within vessel 110 and for withdrawal as by way of a line 120 to a compressor, described in connection with FIG. 4. The extension or upwardly inclined portion 117 has therein a suitable conveying means shown as a screw-type conveyor 121 for transport of the discrete particles together with their layers of ice. As these particles with adhering ice move upwardly above the level of the brine in portion 117, they are cleansed of adherent brine by a water wash supplied from a line 122 and spray heads 123 and 124. The discrete particles and the layers of ice cleansed of brine are then deposited by the screw conveyor 121 into a vertical portion of a vessel 125 provided with a liquid-level controller 126 to maintain therein a predetermined level of fresh water. This vessel 125 may include ice melting means, such a hot refrigerant vapors, supplied thereto by way of a line 128. The discrete particles, all heavier than water, settle downwardly of the vessel 125 and are picked up by a conveyor shown as a screw conveyor 129 and transported through the inclined section 130 of vessel 125 and delivered to a section 131 to a vertical conveyor 132. The conveyor 132, though it may be of any suitable form, has been shown as comprising a plurality of material-carrying blades for the lifting of the discrete particles upwardly to an inclined feed pipe or chute 133 for supplying the discrete particles to the star-feeder valve 113 for return to vessel 110.

The hot refrigerant vapor supplied by way of line 128 from the compressor enters into the level of liquid within vessel 125 for intimate heat exchange therewith, the ice being melted and the refrigerant being condensed. The refrigerant and water are removed through the operation of the liquid-level controller 126 and delivered together by way of line 138 to a separating vessel 139. Fresh water is withdrawn as an end product from a discharge line 140, while liquid refrigerant is removed by a discharge line 141 to a receiving vessel 142. The liquid refrigerant is picked up by a pump 143 and a substantial fraction of it delivered by a line 144 for mixture with sea water supplied to the system by a supply line 145.

The remainder of the refrigerant is delivered by way of line 146 to a pressure-reducing head 147 for flashing of the refrigerant within the vertical vessel 148 containing the lift-conveyor 132, with the refrigerant vapor flowing by way of lines 133 and 134 to a compressor. It is in this manner that the discrete particles are super-cooled, i.e., chilled to below the freezing temperature of the water and thus enter the vessel 110 at a temperature to assist in the formation of ice from the feed stream.

In order to minimize and prevent formation of ice prior to contact with the discrete inert particles and to promote controlled super-cooling, a pump 150 is supplied with brine from the liquid-level controller valve 115, and a part of the brine is recirculated by way of valve 151, that recirculated portion entering the line 144 for mixture with the incoming sea water feed and the refrigerant is such that the initial freezing temperature of the mixture of feed and recirculated brine is only a few degrees different from the temperature maintained in vessel 110, thus assuring controlled super-cooling. The remainder of the brine passes by way of valve 152 to a pipe 153 and thence to waste, or to storage when the system is utilized for concentration of citrus fruit juices and the like.

As in the preceding embodiment of the invention, the discrete, sinkable particles in vessel 110 will be present in amount corresponding with between 30% to 50% by volume of the stream of sea water. By enlarging the vessel 110 or by increasing the speed of operation of motors 160 and 161 and the speed of operation of the conveyor 132, particles in sizes greatly exceeding about 3 millimeters may be utilized, the necessary surface area for a given production of adhering ice being provided in this manner.

For ease in description, the arrangement of FIG. 3 has been shown diagrammatically and not as in an actual installation. As best shown in FIG. 3A, vessel 125 will preferably be located directly behind the vessel 148 and the receiving vessel 110 will be located in front of vessel 125, this disposition of the apparatus requiring much less floor space and a minimum of length for the delivery chute 133.

In FIG. 4, the same parts have been designated by the same reference characters as in FIG. 3. For example, it will be seen that the feed stream enters by way of line 145, is elevated in pressure by a pump 165, is sent in divided flow through heat exchangers 166 and 167, in single flow in line 144, is joined by streams of refrigerant supplied thereto by way of a line 144a in flow connection through lines 169 and 170 respectively receiving refrigerant from pumps 143 and 172 in flow connection with refrigerant supply vessels 142 and 173. The line 144 receives the recycled brine by way of valve 151 from pump 150 flow-connected to the passage 117. The combined mixture enters the freezing vessel 110, with refrigerant withdrawn therefrom being supplied to a compressor 180. Refrigerant delivered from compressor 180 is divided in flow, a part going to a second compressor 181 and the remaining part by way of a line 128 to form the supply of hot refrigerant vapor to the vessel 125. The vessel 125 in FIG. 4 schematically includes the separating vessel 139 of FIG. 3 and has been so shown to simplify the illustration of withdrawal of refrigerant by way of line 141 to the refrigerant receiver 142 and the withdrawal of purified fresh water by way of line 140 to a pump 187. The cold fresh water is utilized in heat exchange, flowing by way of line 188 to heat exchanger 167 and by way of a line 189 to a refrigerant stripper 190 which, for most applications, will be a desirable piece of apparatus to include in the system. From the refrigerant stripper, refrigerant-free fresh water is delivered by a pump 131 to storage or to further treatment where that is indicated for purposes of chlorinization and the like. A part of the fresh water stream from pump 187 is returned by a line 122 to form the source of wash water for the ice within the inclined portion 117 of the vessel 110.

As in the embodiment of FIGS. 1 and 2, a slip stream from pump 150 of the cold brine from inclined vessel 117 is circulated by lines 190 and 191 through a cooling coil 192 in vessel 142 to maintain the liquid refrigerant below its vaporization temperature. The waste brine flowing through the valve 152 passes through the heat exchanger 166 to cool the incoming feed water and then passes through a further heat exchanger 193 to cool and condense hot refrigerant flowing through line 194 from the compressor 181 and to the refrigerant receiver 173. Where the cooling for the waste brine is inadequate to liquefy the refrigerant, additional cooling water will be supplied to the heat exchanger 193 as by way of a supply line 196.

In the embodiment of FIG. 4, it will be noted that a compressor 198 is provided to receive refrigerant from the line 134 in flow connection with the inclined chute 133 (see particularly FIG. 3). This refrigerant which was utilized to super-cool the discrete particles enroute to the vessel 110 is compressed and flows from compressor 198 to form a part of the inlet stream to the compressor 180.

As previously described, the refrigerant used in the methods and apparatus of FIGS. 1–4 is selected to be inert to the ingredients of the sea water and the discrete particles. The temperatures and pressures used in the different stages of operation will be dependent upon the refrigerant selected and the nature of the feed stream. Any standard reference may be used in this selection of temperatures and pressures, such, for example, as "The Refrigeration Data Book," volume I, and "Refrigerating Principles and Machinery," published by the American Society of Refrigeration Engineers.

It is to be understood that the foregoing embodiments of the invention are to be taken as illustrative of the manner in which the methods of the present invention may be practiced and further illustrative of the typical apparatus forming embodiments of the present invention. Features of one modification may be utilized in the other, and apparatus of differing character may be utilized in place of some of the elements schematically illustrated. It is intended by the claims appended hereto to set forth the true scope of the present invention and the equivalents thereof.

What is claimed is:

1. The method of separating from a liquid feed stream two components one comprising a solvent and the other solids dissolved in said solvent, the freezing temperature of the mixture varying inversely with the concentration of solids present in said stream, which comprises withdrawing heat from said feed stream to lower its temperature, adding to said feed stream a low-temperature recycle stream having dissolved solids present in materially higher concentration than in said feed stream to lower the freezing temperature of said feed stream, adding to said mixture of said feed stream and said recycle stream a liquefied refrigerant to bring the temperature of said mixture below the freezing temperature of said feed stream, supplying to a freezing zone a stream of discrete particles of a material permanently solid at room temperature and presenting surfaces to which one of said components of said mixture will adhere when frozen, super-cooling said solid particles prior to their delivery to said freezing zone, concurrently supplying to said freezing zone said mixture at its temperature below the freezing temperature of said feed stream to induce rapid freezing on said particles of said one component, removing from said freezing zone to a washing zone said particles together with said frozen component, washing adherent liquid from said frozen component, withdrawing from said freezing zone a part of said unfrozen mixture as said recycle stream, and withdrawing said frozen component from said washing zone and returning said solid particles to their region of super-cooling.

2. The method of desalting a feed stream of sea water, comprising
withdrawing heat from said feed stream to lower its temperature,
adding to said feed stream a low-temperature recycle stream having dissolved salt present in materially higher concentration than in said feed stream to lower the freezing temperature of said feed stream,
adding to said mixture of said feed stream and said recycle stream a liquefied refrigerant to bring the the temperature of said mixture below the freezing temperature of said feed stream,
Supplying to a freezing zone a stream of discrete particles of a material permanently solid at room temperature and presenting surfaces to which ice will adhere,
super-cooling said solid particles prior to their delivery to said freezing zone to bring them to a temperature below the freezing temperature of said feed stream,
concurrently supplying to said freezing zone said mixture at its temperature below the freezing temperature of said feed stream to induce rapid freezing on said particles of said ice,
removing from said freezing zone to a washing zone said particles together with ice adherent thereto,
washing adherent liquid from said ice,
withdrawing from said freezing zone a part of the unfrozen mixture as said recycle stream,
withdrawing said ice from said washing zone, and
returning said solid particles to their region of cooling.

3. The method of desalting a feed stream of sea water which comprises,
withdrawing heat from said feed stream to lower its temperature,
supplying to said feed stream a seed-slurry of finely divided discrete particles of material permanently solid at room temperature and presenting surfaces to which ice will adhere,
adding under pressure to said feed stream a liquefied refrigerant of composition inert to said feed stream and to said particles,
reducing said pressure for expansion of said refrigerant to induce bubble formation and to super-cool the mixture by bringing the temperature of said mixture below the freezing temperature of said feed stream,
thereafter delivering said mixture comprising said feed stream, said refrigerant and said seed-slurry to a freezing zone,
further reducing the pressure on said mixture including said feed stream for further expansion of said refrigerant for rapid cooling in said freezing zone of said feed stream and of said particles and for increasing the production within said freezing zone of a multiplicity of bubbles which hasten the freezing of said ice on said particles,
removing from said freezing zone to a washing zone said particles together with ice adherent thereto,
washing adherent liquid from said ice,
withdrawing said ice from said washing zone,
supplying to a melting zone refrigerant vapors at elevated temperature to said washed ice particles to melt said ice,
withdrawing from said melting zone said refrigerant for further cooling,
returning said solid particles in the form of said seed-slurry to said feed stream,
withdrawing from said freezing zone a stream whose salt concentration is materially higher than that of said feed stream, and
utilizing said withdrawn stream for withdrawing said heat from said feed stream.

4. The method of claim 3 in which said discrete particles are buoyant, said multiplicity of bubbles adding to the buoyancy of said discrete particles with their adherent layers of ice.

References Cited by the Examiner
UNITED STATES PATENTS

| | | | |
|---|---|---|---|
| 2,579,421 | 12/51 | Egan | 62—58 |
| 2,764,488 | 9/56 | Slattery | 62—123 |
| 2,821,304 | 1/58 | Zarchin | 62—58 |
| 2,896,419 | 7/59 | Thompson | 62—58 |
| 2,997,856 | 8/61 | Pike | 62—58 |
| 3,017,752 | 1/62 | Findlay | 62—58 |
| 3,070,969 | 1/63 | Ashley | 62—58 |
| 3,098,734 | 7/63 | Svanoe | 62—58 |

FOREIGN PATENTS

| | | |
|---|---|---|
| 70,507 | 6/46 | Norway. |
| 217,766 | 10/58 | Australia. |
| 841,374 | 7/60 | Great Britain. |

NORMAN YUDKOFF, *Primary Examiner.*

ROBERT A. O'LEARY, *Examiner.*